United States Patent [19]
Sane

[11] Patent Number: 4,595,545
[45] Date of Patent: Jun. 17, 1986

[54] REFRACTORY METAL BORIDES AND COMPOSITES CONTAINING THEM

[75] Inventor: Ajit Y. Sane, Willoughby, Ohio

[73] Assignee: ELTECH Systems Corporation, Boca Raton, Fla.

[21] Appl. No.: 454,718

[22] Filed: Dec. 30, 1982

[51] Int. Cl.$^4$ .............................................. C22C 29/14
[52] U.S. Cl. ....................... 264/65; 423/297; 423/411; 423/440; 501/12; 501/87; 501/96
[58] Field of Search ............... 423/289, 297, 409, 411, 423/439, 440; 501/87, 96, 12; 204/67; 264/65

[56] References Cited

U.S. PATENT DOCUMENTS

| | | | |
|---|---|---|---|
| 3,106,456 | 10/1963 | Ripley | 423/440 |
| 3,379,647 | 9/1968 | Smudski | 423/439 |
| 3,471,380 | 10/1969 | Bullough | 204/67 |
| 3,649,314 | 3/1972 | James | 501/96 |
| 3,692,474 | 9/1972 | Arber et al. | 423/409 |
| 3,749,571 | 7/1973 | Stibbs et al. | 501/96 |
| 3,791,808 | 2/1974 | Thomas | 501/12 |
| 4,282,195 | 8/1981 | Hoekje | 423/289 |
| 4,376,029 | 3/1983 | Joó et al. | 204/67 |

FOREIGN PATENT DOCUMENTS 1004585 9/1965 United Kingdom.

OTHER PUBLICATIONS

Gonzalez-Oliver et al., "Glass Ceramic Formation and the Preparation of Glasses by the Sol-Gel Method", Glass, Aug. 1981, pp. 304–307.
"Preparation of Glasses and Ceramics from Metal-Organic Compounds", Yoldas, Journal of Materials Science 12 (1977), pp. 1203–1208.

Primary Examiner—Howard S. Williams
Assistant Examiner—Terryence Chapman
Attorney, Agent, or Firm—John J. Freer

[57] ABSTRACT

Refractory metal borides, carbides, nitrides and mixtures thereof of the Group IVb, Vb and VIb metals are produced from a glass or microcrystalline gel formed from organo-metallic precursors. Typically $TiO_2 \cdot B_2O_3$ glass is produced by hydrolysis of titanium butoxide and trimethyl borate, followed by gelling/drying. The glass may have carbon inclusions or may be mixed with carbon or aluminum powder or a mixture thereof, and reacted. In the case of aluminothermic and carboaluminothermic reduction, there is a residual aluminum-containing phase in the product. Composites can also be produced by including inert materials in the reaction mixture.

13 Claims, No Drawings

REFRACTORY METAL BORIDES AND COMPOSITES CONTAINING THEM

TECHNICAL FIELD

The invention relates to the borides, carbides and nitrides of Group IVb (titanium, zirconium and hafnium), Group Vb (vanadium, niobium and tantalum) and Group VIb (chromium, molybdenum and tungsten), often referred to as refractory metal borides, carbides and nitrides, and in particular to their methods of production. The invention also concerns composite materials including the refractory metal borides, carbides and nitrides typically with an aluminum-containing phase, and the production of these composites, as well as components of electrolytic aluminum production cells incorporating the refractory metal borides, carbides or nitrides or composites based upon them.

BACKGROUND ART

The refractory metal borides, carbides and nitrides have already been proposed for use as components of electrolytic aluminum production cells, particularly those components which in use may normally be contacted with molten aluminum, such as an electrowinning cathode or cathode current feeder. Borides and in particular titanium diboride are often preferred on account of their excellent wettability by molten aluminum, good electronic conductivity and so forth. However, many problems have been encountered in producing these materials with a sufficient resistance to attack by molten aluminum and by the conventional alumina-containing cryolite-based melts used in aluminum electrowinning cells.

It is known to produce borides by the carbothermic reduction of oxides e.g. titanium oxide and boron oxide, or by chemical reduction with alkali metals, magnesium or aluminum. Typically, titanium dioxide and boric anhydride, or titania hydrate and boric acid are used as starting materials and the product is a boride powder. These boride powders are relatively impure and when they are formed into a body e.g. by hot pressing or sintering, the bodies are prone to severe grain boundary corrosion when exposed to molten aluminum. For example, UK Patent Specification No. 1004585 discloses the production of $TiB_2$ by reacting carbon with anatase or rutile titanium dioxide in a glassy matrix of boron oxide formed from boric acid. U.S. Pat. No. 3,379,647 describes boride production from intimately mixed reactants including boric acid or borax as a boron source, a carbon source, and an unspecified source of an oxide of a boride-forming metal. However, in both instances, full reaction of the components is unlikely and contamination of the products with unreacted reactants makes them unsuitable for many uses such as components of electrolytic aluminum production cells which contact the molten aluminum.

Another way of making titanium diboride articles is by heating pellets of boron carbide ($B_4C$), carbon and rutile titanium dioxide, grinding the resulting titanium diboride pellets into a powder and shaping and sintering the powder. However, the grinding operation is expensive and necessarily introduces impurities due to the abrasive nature of $B_4C$ thereby making the resulting articles non-resistant to contact with molten aluminum.

The production of submicronic boride powders by vapor phase reaction of chlorides has been proposed in U.S. Pat. Nos. 4,282,195, and these submicron powders can be sintered into bodies. This process is relatively complicated and the powder handling, pressing and sintering operations necessarily introduce impurities.

It is also known to produce borides by electrolysis of a melt typically containing the metal oxide and boron oxide or borax with a flux of alkali or alkaline-earth halides or fluoroborates. This process is however limited mainly to coatings and is relatively expensive.

DISCLOSURE OF INVENTION

A main aspect of the invention, as set out in the claims, concerns a method of producing a Group IVb, Vb or VIb metal boride, carbide, nitride or mixtures thereof by chemical reaction of an oxide of the Group IVb, Vb or VIb metal(s) with an appropriate reagent or reagents including carbon, boron, nitrogen and nitrogen compounds such as aluminum nitride, or mixtures thereof or mixtures with aluminum, alkali metals, magnesium or boron compounds in particular boron oxide. According to the invention, this method is characterized in that the Group IVb, Vb or VIb metal oxide(s) used in the reaction is or are in the form of a glass or a microcrystalline gel having a grain size up to 200 Å produced by controlled hydrolysis of an organic solution containing the metal, e.g. as an organic compound such as titanium butoxide, followed by gelling/drying. The glass obtained is typically an amorphous oxide but may include microcrystalline oxide with a particle size typically in the range 30–70 Å and up to 200 Å maximum, the hydrated form of which is referred to as a microcrystalline gel. At room temperature, when the reaction mixture is formed, the starting material will be a glass or a gel with only a relatively low amount of microcrystalline oxide, but as the mixture is heated up the microcrystalline oxide inclusions tend to grow. Precipitation of a second phase from a glass depends on the composition and thermal treatment.

Advantages of using a glass or microcrystalline gel of the oxide prepared from organic starting materials include the ease of preparation of the glass, in which oxide reactant is dispersed on an atomic scale, at low temperatures, and high reactivity of the oxide glass which favors full reaction and therefore pure final materials. Further advantages of specific embodiments will appear later.

Hydrolysis may be carried out starting from a pre-prepared organic compound of the metal, e.g. titanium butoxide. Alternatively, it is possible to hydrolyze a solution of a halide of the Group IVb, Vb or VIb metal, e.g. $TiCl_4$, in alcohols, glycols or suitable organic solvents. Hydrolizing can be achieved by water vapor solution of boric acid in water. The resultant product is then carefully dried to eliminate organic volatiles.

The hydrolysis is usually carried out by controlled drying of the solution to produce a glass powder, but another way of preparing the glass powder is the spray drying of the metal-containing organic species such as titanium butoxide and trimethyl borate with water in a heated chamber. The flow rates, nozzle geometry and temperature of the heated chamber as well as the temperature gradients can be controlled to give reactive powders in essentially amorphous form or with a microcrystalline dispersion of the constituents. This process will eliminate the need for light grinding of the dried gel and will therefore simplify the process.

Spray drying can also be used to prepare reactant mixtures from organometallics in conjunction with inorganic constituents e.g. TiCl$_4$, BCl$_3$ or H$_3$BO$_3$ solution with or without added sugar. If particulate reducing agents such as carbon black and aluminum powder are to be used, care would have to be exercised to assure that the reducing agents are not excessively oxidized by the solvents. However, if necessary, the glassy powder can be produced first and then mixed with the carbon black or aluminum powder in a separate step.

Yet another method of preparing reactive oxide glasses from organometallics or inorganic chemicals and organic solvents would be freeze-drying. This involves spraying the organic solutions along with water-based solutions into a chilled organic such as xylene or into liquid nitrogen. The chilled powders are then slowly heated under vacuum to remove the solvents and obtain highly reactive starting glass powders.

In one embodiment, a carbide, nitride or a mixture of carbide and nitride of the Group IVb, Vb or VIb metal(s) is produced by intimately mixing carbon or a carbon precursor such as sugar or furfuryl alcohol in the glass or gel, the carbon typically having a particle size of <500 Å. Hydrolysis of an organic compound of a metal using a sugar solution followed by controlled heat treatment under an inert atmosphere generally gives a glassy product in which the distribution of reactants is on an atomic scale. Such a distribution is essential for (1) completion of the reaction and (2) reduction of the sintering temperature. Thus the glass or gel is a physical mixture of the amorphous or microcrystalline oxide (200 A) and particulate carbon (<500 Å). The reaction is then carried out under vacuum or in an inert atmosphere such as argon or in a nitrogen atmosphere when nitride formation is desired. Typical reaction schemes are:

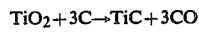

$$TiO_2 + 3C \rightarrow TiC + 3CO$$

$$TiO_2 + 2C + 0.5N_2 \rightarrow TiN + 2CO$$

or a combination of these.

In a very advantageous embodiment for the production of a boride or a mixture of boride with carbide and/or nitride of the Group IVb, Vb and VIb metals, the reaction is carried out with a glass or microcrystalline gel containing the Group IVb, Vb or VIb metal oxide and boron oxide, preferably produced by coprecipitation of the oxides from an organic solution containing metal and boron, the oxides usually being coprecipitated by controlled hydrolysis followed by gelling/drying. Typical organic compounds would be alkoxides (alcoholates), isopropoxides, butoxides and amyloxides, the preferred compounds being titanium butoxide and trimethyl borate. Hydrolysis can be achieved by exposing the solution to air containing water vapour, and typically in the temperature range 25°-100° C. In the hydrolysis reaction, the organometallic compounds react with water to form their corresponding hydroxides and alcohols; the alcohols are then expelled and in the gelling and drying step the hydroxides are converted to the oxides by the removal of water. Alternatively, spray-drying or freeze drying could be used. As a result, a translucent brown glass is obtained in this case of the TiO$_2$.B$_2$O$_3$ system; this glass may contain some water which can be removed by controlled heating. The glass is soft and hence can be easily ground to a desired particle size. In this glass or microcrystalline gel, the boron oxide will always be amorphous i.e. as a glass and the other metal oxide may partly be a glass or it may partly precipitate out during heating to give uniformly dispersed particles with a typical particle size of 30-70 Å, maximum 200 Å; the formation of such a mixed glass or microcrystalline solid between the Group IVb, Vb and VIb metal oxides and boron oxide is surprising in view of the published data on the respective oxides. For example, TiO$_2$ and B$_2$O$_3$ have limited solubility in each other but in the glass their separation is limited due to restricted mobility. Hence a solid body is obtained in which distribution of titanium and boron is very uniform and on an atomic scale. In many instances the glass or gel will contain the metal oxide and boron oxide in the exact molar ratio to form the boride e.g. TiB$_2$; this is however not essential in all cases, especially when a mixture of boride with carbide and/or nitride of the Group IVb, Vb or VIb metal is desired.

Often, oxides of metls such as TiO$_2$ and B$_2$O$_3$ show limited solid solubility. Since it is desirable to achieve mixing of the reactants as uniformly as possible and often in an atomic scale, it is necessary to produce the reactants in such form that their separation due to the limited solubility is minimized by reducing the mobility of the constituants. In this invention, the properties of glasses prepared by the organo-metallic route are used to achieve the reactions in an improved manner.

Advantages of the organo-metallic route for preparing the starting mixed TiO$_2$.B$_2$O$_3$ type glasses or microcrystalline gels are: an intimate mixing of the reactants, often at atomic scale; preparation of the mixture as a glassy phase occurs at low temperatures, which is energy efficient and convenient; uniform mixing of the reactants on an atomic scale is achieved at low temperature, in spite of limited mutual solubility of the constituent phases such as TiO$_2$ and B$_2$O$_3$.

Advantages of using the thus produced mixed TiO$_2$.B$_2$O$_3$ type glasses or microcrystalline gels as starting material in the production of borides include: homogeneity, reactivity and high surface area of the reactants; reduced firing time and temperature; high grain density of powders of the reactant glass; and high purity of the glass. The combination of these features enables the production of borides of desired high purity in a simple procedure which does not involve prolonged milling or grinding operations.

The various reactants mentioned previously can be used to reduce this composite glass or gel of the metal oxide and boron oxide, one main option being carbothermic reduction using carbon or a carbon precursor intimately mixed in the glass or gel, the carbon having a particle size of less than 500 A. Another advantage of using the TiO$_2$.B$_2$O$_3$ glass is to favor topochemical aspects of the reaction to produce TiB$_2$ and minimize the carbon and oxygen content by their elimination due to the formation of CO. The basic reaction scheme of this carbothermic reduction is

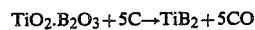

$$TiO_2.B_2O_3 + 5C \rightarrow TiB_2 + 5CO$$

and this reaction may be carried out as follows.

A solution is prepared using organo-metallic compounds of titanium and boron such that the molar ratio of Ti to B is 1:2. Suitable compounds are titanium-butoxide and trimethyl borate. These are mixed with the required amount of carbon in the form of carbon black or similar or a sugar/water solution. The amount added is sufficient to reduce the oxides to the required product according to the reaction scheme. The resultant mixture is mixed to that a carbon suspension is obtained. The mixture is then stirred vigorously and cooled to $-20°$ to $-40°$ C. using a dry ice and acetone mixture, and then completely hydrolysed by the addition of water. The mixture is allowed to gel and stirring is stopped.

In the next step, the gel is subjected to controlled heating at about 100° C. to remove butanol, methanol and other volatile organics. The mixture is then heated in argon to remove the remaining organics as well as water. This is generally achieved in the temperature range of 100°–400° C. Again, the spray-drying or freeze-drying process could be used as alternatives.

The product obtained is a glass which is soft and easy to grind into a fine powder. If desired, grinding can be eliminated by using a spray drying technique to produce the desired powder of the glass by spraying the organometallic compounds and water. At this stage, the product can be analysed for the required ratio of the reactants, i.e. $TiO_2.B_2O_3$ and C. The mixture can be adjusted if necessary to give the desired ratios. The powder is pressed into a pellet. A binder may be added to impart green strength. However, it must be such that it can be removed at low temperatures without altering the ratios of the reactants.

The pressed pellets are then heated preferably in vacuum (10–500 millitorr) in the temperature range of 1100°–1800° C. The use of vacuum allows reduction of the oxide glass at low temperatures and permits the production of $TiB_2$ powders with small grain size suitable for sintering. If necessary this firing is preceded by a preliminary firing cycle to remove binder at low temperatures (200°–300° C.). The main firing can be conducted for a duration of about four hours. Monitoring of pressure is necessary to determine if the reaction has reached completion or is near to completion. The product is a highly porous friable solid. Consequently light grinding can be used to obtain a powder, so that the product at this stage is fine submicron $TiB_2$ powder. The oxygen and carbon contents of the powder are determined by the extent of the reaction. Under certain circumstances such as rapid heating, loss of boron may be observed. Hence, either firing conditions or the reaction mixture has to be adjusted for excess boron so that the final product is $TiB_2$.

The powder of $TiB_2$ can be either adjusted for oxygen to carbon ratio or it can be pressed directly to obtain a shaped article. Once again, a binder may be necessary to impart green strength. After firing at low temperatures to remove binder, the pressed article is heated to a temperature in the range of 1900°–2500° C. preferably in vacuum and generally for 2–12 hours. After cooling, a $TiB_2$ body in the required shape is obtained. The selection of firing temperature and time is based upon two criteria:

1. Reduction of C and O content by mutual reaction to form CO
2. Sintering of $TiB_2$.

During the second step of firing, additives such as AlN, or TiN-AlN, may be added to reduce exaggerated grain growth or to act as a second phase with high solubility for O and C or to obtain a desired composite. Also, during the latter shape of firing, an atmosphere of inert gases can be used to replace vacuum, or a nitrogen atmosphere can be used when nitride formation is desired.

Thus, the boride of the Group IVb, Vb or VIb metal can be formed by the carbothermic reduction process as a powder or as a friable body which is ground to powder, and the boride powder is then compacted and sintered into a body. Alternatively, a porous self-sustaining boride body of controlled porosity and grain size can be formed in a single-step process by the carbothermic reduction of the mixed glass or microcrystalline gel, for example as disclosed in U.S. patent application Ser. No. 502,099. This will involve controlled heating of the reaction mixture whereby the evolved CO will produce a desired porosity which may correspond to 10–90 volume % of interconnected voids, usually 20–60 volume %.

Many variations of the basic carbothermic reaction scheme can be contemplated, e.g.

$$(2TiO_2).B_2O_3 + 8C \rightarrow TiB_2 + TiC + 7CO$$

$$(2TiO_2).B_2O_3 + 7C + \tfrac{1}{2}N_2 \rightarrow TiB_2 + TiN + 7CO.$$

$$TiO_2.B_2O_3 + 5C + 3/2N_2 \rightarrow TiN + 2BN + 5CO$$

or a combination of these reactions.

Also various additives can be added to obtain composites, e.g. an inert additive or support such as alumina can be included in the $TiO_2.B_2O_3$ reactant to produce a $TiB_2/Al_2O_3$ composite of the required composition. The reactant glass can also be applied to an inert support to produce a boride coating, e.g. to a foam or honeycomb of alumina. Other inert materials can usefully be included in the reaction mixtures, depending on the desired properties and the intended use of the composite. For example, $Si_3N_4$, BN, $AlB_{12}$, AlON and SiAlON are useful additives for high-temperature applications. The incorporation of BN would improve the machineability of the composite.

Another main aspect of the invention is the production of a composite material of a boride of the Group IVb, Vb or VIb metal, or a mixture of such a boride with a carbide and/or nitride of the Group IVb, Vb or VIb metal, with an aluminum-containing phase by reacting the glass or gel of the Group IVb, Vb or VIb metal oxide and boron oxide with aluminum or aluminum compounds such as aluminum nitride, or mixtures thereof. Again, inert materials can be included in the reaction mixture if desired.

The $TiO_2.B_2O_3$-type glass or gel may be prepared as described previously from organo-metallic compounds by the sol-gel technique, and it is possible to incorporate the finely divided aluminum and/or aluminum compound in the glass or gel during formation thereof. However, it will often be convenient to mix a finely divided powder of aluminum and/or the aluminum compound with a preprepared finely-divided powder of the glass or gel. Since aluminum melts above 660° C., it has a sufficiently high mobility for reaction at the reaction temperatures and the presence of discrete particles of aluminum in the reaction powder is not detrimental.

Carrying out the aluminothermic reaction starting from a glass prepared by the organo-metallic route is very advantageous, compared to starting from a powder mix such as $TiO_2$ and $B_2O_3$ powders often with a particle size >500 Å. When discrete powders are used, during the reaction unwanted phases such as $Al_3Ti$ and $AlB_{12}$ tend to form and the rate of further reaction to completion is diminished. This leads to the presence of phases like $Al_3Ti$ at the grain boundaries, which drastically reduces the stability of the material in molten aluminum. In the case of a starting powder of a glass such as $TiO_2.B_2O_3$ prepared according to the invention, the Ti and B are intimately mixed and hence the presence of detrimental phases such as $Al_3Ti$ at the grain boundaries is eliminated. Furthermore, the components of the glass are able to proceed to full reaction, so that there is no unwanted residual starting oxide at the grain boundary, which would also be detrimental to the stability of the material in molten aluminum. Similar considerations apply to the carbothermic reductions and combined carbo-aluminothermic reductions.

The reaction scheme of the basic aluminothermic reaction is $$TiO_2.B_2O_3 + 10/3\ Al\ TiB_2 + 5/3\ Al_2O_3$$

when the reaction is carried out in an inert atmosphere such as argon, or under vacuum. This basic reaction may be carried out as follows.

In the first stage, $TiO_2.B_2O_3$ glass is made by the organo-metallic route to obtain a homogeneous reaction mixture of Ti and B which is essential for obtaining the desired reaction products, namely $TiB_2$ and $Al_2O_3$. Synthesis via the organo-metallic route is preferably chosen due to ease of fabrication and excellent reactivity of the reaction mixture which leads to products of improved purity. In particular, the glass can be obtained by controlled hydrolysis of a homogeneous solution of titanium butoxide and trimethyl borate (Ti/B ratio being 1:2 by moles). The hydrolysis is achieved by exposing the solution to air containing water vapor and can be carried out typically in the temperature range of 25°–100° C. As a result of this hydrolysis, a translucent brown glass can be obtained in the case of the $TiO_2.B_2O_3$ system. The glass can contain some water which can be removed by controlled heating. The glass is soft and hence can be lightly ground to the desired particle size. Preparation of the glass powder can be accomplished by spay drying or freeze drying to avoid grinding.

In the second stage, aluminum powder is added to the glass powder in an amount sufficient to complete the reaction. An excess amount can be added to give a desired $TiB_2/Al_2O_3/Al$ ratio in the finished product. Excess aluminum will serve as a binder of $TiB_2$ as well as alumina (which is wettable to aluminum due to the activation of its surface by Ti and B, which act as surface active agents). $TiB_2$ or $Al_2O_3$ can be added to the reactants to modify the ratios of these components in the product. When alumina is included in the reactants it can be chosen in such a form as to impart strength to the final composite by reinforcement of the composite. For example, fibers of $Al_2O_3$ that are made wettable by Al can be used either as fibers or woven structures. This structure can then be incorporated into the $TiO_2.B_2O_3$ and Al powder mix and consolidated to give desired shape and strength at elevated temperatures. The consolidation can be achieved by conventional means such as cold isostatic pressing, dry pressing in a mold, roller pressing.

In the third stage, the consolidated and possibly reinforced structure is fired in inert atmosphere or under vacuum to achieve the completion of the reaction. Since this reaction is exothermic, the heat released during the reaction can be used to raise the temperature of the compact at a reduced amount of external heating. Typically, the reaction can be carried out in the temperature range of 800° to 1600° C. As a result of this reaction, fine grain sized $TiB_2$ and alumina are obtained. The resultant structure has sufficiently high viscosity so that the shape of the compact is retained even after firing at high temperatures such as 1500° C.

The quantity of aluminum in the reactant can thus be chosen so that it is fully or substantially fully converted to alumina, or aluminum nitride or oxynitride when the reaction is carried out in the presence of nitrogen. Alternatively, there may be excess aluminum in the reaction mixture so that an unreacted aluminum phase is still present in the composite material. In this case, it can be advantageous to subsequently heat the composite in a nitrogen atmosphere to convert the aluminum to aluminum nitride. Reaction of the $TiB_2$ with nitrogen can be minimized by the choice of temperatures and the nitrogen partial pressure as well as the total pressure.

The reaction mixture may also further comprise carbon or a carbon precursor, thus providing a combined carbo-aluminothermic reduction. This can be very advantageous from two viewpoints. Firstly, the carbon moderates the exothermic nature of the reaction and facilitates thermal control of the process whereby it is possible to avoid formation of large grains of fused alumina, thus providing a very homogeneous grain structure. Secondly, the carbon monoxide evolved assists in the formation of pores in the composite body, and controlled thermal conditions can be chosen to provide a composite body of selected uniform porosity in a single-stage process.

It may also be advantageous to include some aluminum nitride in the reaction mixture since it has been found that sometimes aluminum may be trapped in the grain boundaries and remain unreacted, leading to weakness and liability to corrosion when the body is exposed to molten aluminum. The presence of AlN in the reaction mixture is found to promote complete reaction of the oxide glass or microcrystalline solid to AlON type materials, and improves resistance of the composite to corrosion by molten aluminum.

Also, particularly for applications in which the material is to be exposed to molten aluminum, it has been found very advantageous to firstly produce a porous self-sustaining composite of a suitable boride or boride and carbide/nitride mixture with an aluminum compound such as alumina, aluminum oxynitride and/or aluminum nitride by the aluminothermic or carbo-aluminothermic methhods as described above, in a one-step or two-step process, and preferably with little or no metallic aluminum in the composite body, and then subsequently infiltrate the porous body with molten aluminum. The final body thus consists of a skeleton or matrix of reaction sintered materials consisting often of alumina and $TiB_2$, and an infiltrated phase of metallic aluminum which wets the matrix material and is retained therein when the material is exposed to molten aluminum and/or cryolite. For other applications, cermets can be formed by infiltrating with other metals or alloys. For instance, silver can be used for applications such as contacts for relays where electrical conductivity and excellent wear characteristics are required. Aluminum alloys or intermetallic compounds can also be infiltrated. Alternatively, the porous structures can be filled with elements such as carbon by chemical vapour deposition or thermal decomposition.

A major use of the described boride and composite boride materials is thus as components of electrolytic aluminum production cells which in use are normally contacted with molten aluminum, especially electrically conductive current-carrying components such as electrowinning cathodes and cathode current feeders and electrorefining anodes or anode current feeders, but also non-current carrying cell components including separator walls, weirs for overflowing molten aluminum, packing elements and other structural components. The materials are also suitable for parts such as cathode current feed bars which normally would only be in contact with molten aluminum in case of breakdown. Applications in other molten salt electrowinning processes such as magnesium and sodium electrowinning are also possible, as are uses in molten salt fuel cells and as electrode materials in aqueous electrochemical applications.

The materials are also useful in other applications where the refractory metal borides and composites based thereon are advantageous, such as in aerospace, nuclear and high temperature metallurgical applications. Some specific uses are:

grinding and cutting tools, e.g. $TiC/TiB_2/Ni$ composites, $ZrB_2/SiC/C$; $ZrB_2/Al/Al_2O_3$ and $TiB_2/Al_2O_3/Al$ type composites as oxidation-resistant materials for high temperature applications, thermocouple wells for molten metals, crucibles for molten metals such as aluminum and evaporation boats for aluminum, molten metal filters, high temperature bearings, engine components, and porous bodies as high surface area catalyst supports.

The invention will be further illustrated in the following examples.

EXAMPLE I

A solution was made by mixing 102 g of titanium butoxide and 62.3 g of trimethyl borate, i.e. with a Ti:B molar ratio of 1:2. The solution was cooled to about $-40°$ C. using a dry ice and acetone mixture. Then sugar solution made by dissolving 47.3 g sugar in 42.7 g of water was added to the chilled solution under constant stirring. After gelling of the organometallic solution it was heated overnight at about 65° C. to remove water, butanol and methanol, thus producing a dried powder, grain size 10 u, consisting of agglomerated $TiO_2.B_2O_3$ glass and pyrolized sugar. An x-ray diffraction pattern of the powder revealed essentially an amorphous or glassy product. The dried powder was then heated to 250° C. for 3 hours; again, the x-ray diffraction pattern of the powder revealed essentially an amorphous or glassy product. The charred powder was analysed for carbon and oxygen content. Carbon and oxygen were found to be 26.93% and 18.24% respectively. The carbon content was then adjusted to 28.66% by adding carbon black. The glass powder was then pressed into a pellet with 5% PVA as a binder. The powder was pressed in a PTFE (Teflon, trademark) press at 900 kg and heated in vacuum first at 250° C. to burn off the binder then at 1500° C. for 4 hours. The resultant pellet was made friable due to rapid heating at a rate of 300° C./hour. The powder obtained from the pellet was repressed without binder and heated to 2100° C. in vacuum for 4 hours. Loss of boron was minimized by using BN around the pellet.

The product was a solid body of well sintered highly dense structure with some shrinkage cracks; overall it had a porosity corresponding to approximately 10–20 volume % of voids. X-ray diffraction analysis revealed only $TiB_2$. There was no residual oxide glass. Optical microscopy of the sample showed large equiaxed grains of $TiB_2$ at the surface and small platelets of $TiB_2$, with a grain size of 1–5 micron, in the bulk.

The sample was exposed to molten aluminum at 1000° C. for 10 hours. There was some evidence of aluminum penetration into the surface but there was negligible corrosion in the interior.

EXAMPLE II

A solution was prepared mixing 237.5 g of titanium-butoxide, 157.05 g of trimethyl borate 44.58 g of Ketjen black in 790 cc of methanol. The solution was chilled to about 5° C. using a dry ice and acetone mixture, stirred and 650 g of water was added. After gelling, it was heated to about 80°–100° C. for 2 days to remove the volatile alcohols and water, and then heated at 300° C. for 16 hours and at 400° C. for 1 hour in argon. The resultant powder was mixed with 4% Carbowax 200 (Union Carbide) and isopressed at 2800 $kg/cm^2$. The pellets were heated in vacuum to 1600° C. for 4 hours. The product was a friable body easily ground to a powder which contained both $TiB_2$ and TiC (about 20–30% by weight of TiC). $TiB_2$ and TiC particle sizes were in the range of 0.09–0.5 and 0.03 microns respectively. The reason for TiC formation during heating was boron loss. The powders were repressed using 4% Carbowax 200 as a binder. The samples were then heated in vacuum initially in the range of 200°–300° C. and then at about 2000° C. for about 4 hours. As a result a porous body of $TiB_2$ and TiC was obtained.

EXAMPLE III

A solution of titanium butoxide and trimethyl borate was prepared in methanol, then carbon black was added to the solution such that the mol ratio of Ti:B:C was 1:2:5. The resultant paint solution was used to coat several substrates including C, BN, $Al_2O_3$ as well as a glass slide; the solutions were allowed to hydrolize in air. As the paint dried on the glass slide, several large size flakes were obtained that showed characteristic mud crack pattern. The samples were then heated in vacuum to about 1500° C. for 4 hours. The oxide glasses were converted to a grey metallic layer of $TiB_2$ with grain size of about 0.1–1 micron. The density of $TiB_2$ was maximum at the surface where evolving gases could be quickly removed without seriously disrupting the structure. On the glass slide the $TiB_2$ coating was in the form of flakes and the porosity of the flakes at the surface was estimated to be less than 20–30 volume %; inside the flakes the porosity was higher.

EXAMPLE IV

A solution was prepared by mixing 237.5 g of titanium butoxide, 157.05 g of trimethyl borate and 790 cc of methanol. The solution was chilled to about 5° C. and 88.28 g of Shawinigan Carbon Black was added. The mixture was rapidly stirred and about 3000 cc of water was added. After gelling of the mixture, it was heated in air at 100° C. and then in argon from 200°–400° C. After heating in argon, analysis of the powder showed an amorphous $B_2O_3$ phase containing very uniformly distributed $TiO_2$ (Anatase) precipitates indicating precipitation of some $TiO_2$ from the $TiO_2.B_2O_3$ oxide glass. Particle size of $TiO_2$ was in the range of 35–70 Å. Carbon particles were uniformly distributed in the mix with a particle size of about 500–1750 Å.

The powders were mixed with 4% Carbowax 200 (Union Carbide) and pressed at 3500 $kg/cm^2$, then partly covered by BN to prevent boron loss during subsequent heat treatment. They were then fired in vacuum at a temperature from 20° to 400° C. for about 4 hours, 400°–1100° C. for 2 hours, 1100°–1300° C. for 10 hours. After holding at 1300° C. for 4 hours they were cooled to 20° C. in about 3 hours. Analysis of the sample revealed that the area covered with BN showed greater $TiB_2$ content than the uncovered parts. The other component was TiC. In this one step procedure, a highly porous body was obtained with a void volume approaching 80%.

EXAMPLE V

A solution was prepared using 339.9 g of titanium butoxide and 207.6 g of trimethyl borate. The solution was then allowed to hydrolize in air saturated with water vapor at about 72° C. After hydrolysis, an oxide glass was obtained which was then subsequently heated to remove water and other volatiles.

40 g of the oxide glass powder was then mixed with 27.26 g of atomised aluminum (i.e. 3.2 g or 5% in excess of the amount of aluminum needed to reduce the oxides). After blending the powders, 1% (0.67 g) of polyvinyl alcohol, PVA, was added as binder and the powders were granulated, isopressed at 3500 kg/cm$^2$ and heated in argon at 1300° C. for 12 hours and then in nitrogen for 8 hours. The final body was a reticulated structure of $TiB_2/Al_2O_3$ in a 3:5 mol ratio (36:100 volume ratio) with small quantities of TiN, BN and AlN; this structure had good electrical conductivity. The porosity was estimated to be 37% by volume of voids with a bi-modal pore distribution: small pores of dimensions 1–20 u and large pores of dimensions 50–200$\mu$. The $TiB_2$ was distributed as uniform grains <2$\mu$ dimension. The grain size of the alumina was predominantly 10–60$\mu$ with some fused grains of the order of 500–1000$\mu$.

The reticulated composite structure was then infiltrated with molten aluminum. The heating cycle and atmosphere was as follows: 25°–700° C., 1.5 hours under vacuum; 700°–1000° C., 1 hour under vacuum; 1000° C., 4 hours under vacuum followed by 12 hours under vacuum followed by 12 hours under argon; 1000° C.–25° C., 4 hours under argon. The body was completely infiltrated and its final composition was approximately 20.9% $TiB_2$, 52.1% $Al_2O_3$, 27% Al, traces of TiN, BN and AlN and aluminum borides, especially at the surface. It was possible to remove the surface layer by grinding.

The aluminum-infiltrated composite was tested as a cathode in molten cryolite containing 10% alumina at 1000° C. in a vertical cathode configuration, i.e. the cathode was not immersed under a pool of molten aluminum. The cathodic current density was 0.5 A/cm$^2$. The cathode showed good stability with retention of aluminum in the pores.

In a 100 hour stability test in molten cryolite 10% alumina, there was no evidence of dimensional change whereas a specimen of alumina dissolved completely.

EXAMPLE VI

The procedure of Example V for one-step production of the reticulated composite was repeated with firing under argon to produce a $TiB_2/Al_2O_3/Al$ composite with traces of $Al_3Ti$ and a composition $TiB_2$:23.35%, $Al_2O_3$, 56.85% and Al 19.8%. The trace of $Al_3Ti$ was due to a small loss of boron which could be adjusted by starting with a slight excess of boron oxide in the starting powder. The grain size of the $Al_2O_3$ was in the 1–5 micron range whereas the $TiB_2$ was submicronic. The $Al_2O_3$ grains were completely wetted by the $TiB_2$/Al phase. When tested in molten aluminum/cryolite, the sample showed excellent wettability by molten aluminum but then was some macroscopic deformation due to low viscosity and evidence of attack by cryolite, even when submerged in the aluminum. However, the material is excellently suited as a conductor bar which is not normally exposed to molten Al.

EXAMPLE VII

Example VI was repeated but including $TiB_2$-coated $Al_2O_3$ chips in the starting materials. A typical composition was $TiO_2.B_2O_3$ glass:$Al_2O_3$:Al in the weight ratio 1:2:2 to give an approximate finishing composition of $TiB_2$ 9.3%, $Al_2O_3$ 62.73% and Al 27.97%. The $Al_2O_3$ chips were approximately 1–3 mm size whereas the $Al_2O_3$ formed by reaction had a grain size in the region 1–5$\mu$ and the $TiB_2$ grains were submicromic. The porosity was approximately 5–10% by volume of voids.

One sample was tested as a cathode in a drained platform configuration protruding from molten aluminum into cryolite containing 10% alumina at 1000° C., and showed excellent macroscopic stability and wetting by molten aluminum in the presence of cryolite.

EXAMPLE VIII

A homogeneous $TiO_2.B_2O_3$ oxide glass powder was prepared as in Example IV. A separate batch of the powder was mixed with carbon black with a Ti:B:C mol ratio of 1:2:5. A powder mix was then prepared by mixing 4.47 g of $TiO_2.B_2O_3$ powder, 4.73 g of atomised aluminum grain size approximately 6–9$\mu$ and 24.44 g of $TiO_2.B_2O_3+5C$ in a twin shell blender. About 2 g of Carbowax 200 (Union Carbide) dissolved in methylene chloride was added as a binder. After isopressing at 3500 kg/cm$^2$, the pellets were fired at 1600° C. for 17 hours in vacuum and then 23 hours in nitrogen. The pellets were lightly ground to a powder, repressed at 2820 kg/cm$^2$ and fired at 1800° C. in vacuum for 12 hours and in nitrogen for 4 hours. The resulting material was a structure of $TiB_2$/AlN in a 1:1 mol ratio with a trace of TiC; the porosity corresponded to 20–30 volume % of voids.

The material was infiltrated with molten aluminum as follows: 25°–1000° C., 2 hours, vacuum; 1000° C., 4 hours, argon; 1000°–25° C., 4 hours, argon.

The aluminum-infiltrated composite was tested for 10 hours as a cathode in molten cryolite containing 10% alumina at 1000° C. both in a vertical cathode configuration where electrowon aluminum was allowed to drain continuously from the surface into a pool at the cell bottom and as a cathode current feeder immersed under a cathodic pool of molten aluminum. The material showed good stability and excellent wettability by aluminum.

EXAMPLE IX

A powder mix was prepared in the manner described in Example VIII, except that 50% of the amount of Al needed for reduction was replaced by AlN (i.e. $TiO_2.B_2O_3$, 7,5 g; Al, 2.25 g; AlN, 5.12 g, $TiO_2.B_2O_3+5C$, 24.4 g; and Carbowax 200, 2.0 g in 10 cc methylene). By following essentially the same firing and infiltration schedule as Example VIII, a $TiB_2$/AlN/Al composite was obtained. The corrosion tests on the sample showed good stability of the sample in aluminum and cryolite and excellent wettability by aluminum.

MODIFICATIONS

It is understood that when a mixture of group IVB, VB, or VIB metal boride, carbide or nitride is produced this may be two discrete phases (e.g. a boride and a nitride) or a single complex phase (e.g. a borocarbide or boronitride). Other complex phases for example oxynitrides and oxycarbides may also be included.

In respect of the methods for the production of composite materials particularly as components of electrolytic aluminum production cells, it is understood that the starting glasses produced are organo-metallic compounds according to the claimed invention are but one embodiment of novel production methods in which the group IVB, VB or VIB metal boride/carbide/nitride phase is produced by the reaction sintering of various starting materials, including oxide glasses prepared by other routes. Aluminothermic and carbo-alumino-thermic reactions will be preferred, but carbothermic reduction can also be used with suitable inert materials in the reaction mixture. Concurrently filed U.S. patent applications Ser. No. 454,669 filed 12/30/82 and U.S. Pat. No. 4,514,268 as well as Ser. No. 454,671 12/30/82 and U.S. Pat. No. 4,540,475 give examples of the production of composites by reaction sintering starting from various powdered reactants.

Concurrently-filed UK patent application No. 82/36995 (Ref. PP 1740) gives further examples more specifically of carbothermic reductions. The descriptions of all these patent applications are incorporated herein by way of reference.

I claim:

1. The method of producing titanium diboride or a mixture thereof with a carbide and/or a nitride of the Group IVb, Vb, or VIb metals, comprising:
   (a) preparing a solution of organic compounds comprising alkoxides of titanium and boron wherein the Ti:B molar ratio is at least about 1:2;
   (b) mixing particulate carbon or a carbon precursor in said solution in an amount to provide a Ti:B:C molar ratio or about 1:2:5;
   (c) hydrolyzing and gelling the solution to produce a glass or microcrystalline gell of an amorphous or microcrystalline oxide having a grain size up to 200 A and containing particulate carbon up to 500 A;
   (d) grinding said glass or microcrystalline gel to form a resulting material, optionally adjusting the Ti:B:C molar ratio of the resulting material, and pressing the resulting material into a body; and
   (e) heating the body to reaction temperature under vacuum, an inert atmosphere or nitrogen.

2. The method of claim 1 wherein the heating sinters said body.

3. The method of claim 2 wherein the heating is a controlled heating providing a self-sustaining porous body.

4. The method of claim 1 wherein a composite is formed between the titanium diboride and an added inert material which is in mixture therewith before the heating.

5. The method of claim 1 wherein said solution of organic compounds comprises alkoxides of titanium and boron selected from the group consisting of methoxides, isopropoxides, butoxides, amyloxides and their mixtures.

6. The method of claim 1 wherein said organic compounds are soluble one with the othwer and said solution is prepared without additional solvent.

7. A method of producing a body of a composite material of titanium diboride, an aluminum compound and aluminum, characterized by producing a porous composite body of titanium diboride and the aluminum compound by the method of claim 6 and infiltrating the porous body with molten aluminum.

8. A method of producing a composite material of titanium diboride and an aluminum-containing phase or a mixture of titanium diboride with a carbide and/or a nitride of a Group IVb, Vb, or VIb metal and an aluminum-containing phase, comprising:
   (a) preparing a solution of organic compounds comprising alkoxides of titanium and boron wherein the Ti:B molar ratio is at least about 1:2;
   (b) hydrolyzing and gelling the solution to produce a glass or microcrystalline gel of amorphous or microcrystalline oxide having a grain size up to 200 A;
   (c) grinding said glass or microcrystalline gel into a ground material;
   (d) adding particulate aluminum or an aluminum compound to the ground material of step (c) to form a resulting mixture,
   (e) forming the resulting mixture of step (d) into a body; and
   (f) heating the body at elevated temperature under vacuum, an inert atmosphere or nitrogen to react the ground material.

9. The method of claim 8 wherein finely divided powder of aluminum or aluminum mixed with aluminum nitride is mixed with said glass or gel.

10. The method of claim 9 wherein during heating the aluminum provides aluminum oxide, nitride and/or oxynitride.

11. The method of claim 9 wherein excess unreacted aluminum remains at the end of the heating.

12. The method of claim 11 wherein the excess aluminum is subsuquently reacted with nitrogen to form aluminum nitrides.

13. The method of claim 8 wherein said solution of organic compounds comprise alkoxides of titanium and boron selected from the group consisting of methoxides, isopropoxides, butoxides, amyloxides and their mixture.

* * * * *